United States Patent
Podbelsek et al.

(10) Patent No.: US 11,653,669 B1
(45) Date of Patent: May 23, 2023

(54) ICE CREAM CONE SPIKE

(71) Applicants: Jake Podbelsek, Highland Park, IL (US); Alix Podbelsek, Highland Park, IL (US)

(72) Inventors: Jake Podbelsek, Highland Park, IL (US); Alix Podbelsek, Highland Park, IL (US)

( * ) Notice: Subject to any disclaimer, the term of this patent is extended or adjusted under 35 U.S.C. 154(b) by 36 days.

(21) Appl. No.: 17/404,450

(22) Filed: Aug. 17, 2021

Related U.S. Application Data

(60) Provisional application No. 63/067,102, filed on Aug. 18, 2020.

(51) Int. Cl.
 *A23G 9/50* (2006.01)
(52) U.S. Cl.
 CPC .................................... *A23G 9/506* (2013.01)
(58) Field of Classification Search
 CPC ....................................................... A23G 9/506
 See application file for complete search history.

(56) References Cited

U.S. PATENT DOCUMENTS

| | | | | | |
|---|---|---|---|---|---|
| 2,557,890 | A | * | 6/1951 | Perry | A22C 17/006 |
| | | | | | 294/60 |
| 2,622,268 | A | * | 12/1952 | Glantzlin | B27M 3/00 |
| | | | | | 99/419 |
| 2,632,708 | A | * | 3/1953 | Sueskind | A23G 9/503 |
| | | | | | 426/134 |
| D413,051 | S | * | 8/1999 | Torelli | D7/684 |
| D910,967 | S | * | 2/2021 | Podbelsek | D1/105 |
| 2004/0239131 | A1 | * | 12/2004 | Volk | A47J 43/18 |
| | | | | | 294/61 |
| 2015/0305366 | A1 | * | 10/2015 | Kiely | A21D 13/48 |
| | | | | | 426/94 |

FOREIGN PATENT DOCUMENTS

| | | | | |
|---|---|---|---|---|
| WO | WO-0167882 A1 | * | 9/2001 | A23G 3/566 |

\* cited by examiner

*Primary Examiner* — Nikki H. Dees
*Assistant Examiner* — Andrew E. Merriam
(74) *Attorney, Agent, or Firm* — Lesley A. Wallerstein, LLC

(57) ABSTRACT

An edible ice cream cone spike with a top supporting and surrounding a scoop of ice cream, and a bottom configured to adhere infinitely many edible treats thereonto. This creates infinitely many flavor and texture combinations.

8 Claims, 15 Drawing Sheets

ICE CREAM CONE SPIKE

CROSS REFERENCE TO RELATED APPLICATION

This application claims priority to U.S. Provisional Patent Application 63/067,102 filed Aug. 18, 2020.

FIELD OF THE INVENTION

This invention relates to improvements in ice cream cones.

BACKGROUND OF THE INVENTION

On a hot day, it's refreshing to get some cold, tasty ice cream, especially in a cone. Ice cream can please almost anyone because there are so many flavors to choose from. There are the classic chocolate and vanilla flavors, but they can be as varied as blueberry, licorice, or banana nut fudge.

Mix-ins and toppings are great, too. They're fun, they add more individuality to your favorite flavor, and they make your eating experience just that much better. Unfortunately, the problem with some mix-ins is that they just don't stand up to the consistency of ice cream, particularly hand-scooped ice cream. Many desired mix-ins start out with too weak a consistency, for example donuts or donut pieces, falling apart while getting mixed in or turning into mush after a short period of time, making the whole experience less than satisfying.

And while toppings provide a great alternative by retaining their consistency at the top of the scoop, the problem with toppings is that there's only limited space on top, and you have to eat through them to get to the ice cream, after which, there's no longer a satisfying ratio of toppings to ice cream. So what if the edibles used as toppings weren't on top, but instead were attached in some novel, specifically-configured way to the bottom of the ice cream cone? That way, you could have as many edibles (attached to the bottom of the cone and detachable manually) as ice cream and eat both at the same time.

We created an entirely edible ice cream cone that supports and surrounds a scoop of ice cream as would a "safety cone." However, instead of a simple flat bottom of cake or wafer material, we attached an edible textured spike. This spike acts like a skewer, allowing you mix and match edible treats like cookies, donuts, brownies, granola bars, toasted rice cereal material, and wafers, as well as candy and chocolate, beneath and separate from the ice cream. Edible adhesives applied to the spike ensure the treats stay on until they are eaten or pulled off.

For example, if the edibles were four stacked chocolate sandwich cookies, the user could remove a cookie one-by-one to eat with the delicious, flavored ice cream that he or she chose to pair with the cone. This allows for a full cookie experience with the ice cream, instead of just having a cookie-crumb topping or mix-in.

BRIEF SUMMARY OF THE INVENTION

Our invention comprises an entirely edible ice cream cone made from edible cone material, such as an edible wafer or other dough, specially configured at a top end to support and surround a scoop of ice cream, and at an opposing bottom end, to skewer infinitely many edible treats. The ice cream cone spike comprises a hollow truncated conical top having an open wider end and an open narrower end. The open narrower end connects to and continues into a hollow cylinder open at both ends. We custom fit a platform to seal to perpendicularly to the inside of the hollow cylindrical bottom. This platform closes off and divides the hollow cylinder bottom into an upper interior space, which completely supports and surrounds a scoop of ice cream, and a lower interior space, which conceals the joint where the platform meets the interior of the cylinder.

We join to the side of the platform facing the lower interior space an edible textured spike. This spike extends beyond the boundary of the cylinder. The texture helps create surface friction to help hold the edible treat onto the spike while a person is eating. Edible adhesives further help the treat stick to the spike. The texture may take the form of a plurality of barbs radiating from the surface of the spike. In a first embodiment, these barbs may radiate at an acute angle relative to the spike. In a second embodiment, these barbs may radiate perpendicular to the length of the spike, or they may point toward the platform. The texture may also be engraved or inscribed into the spike. Alternatively, the surface of the spike may be crimped.

REFERENCE NUMERALS

Figure 1:
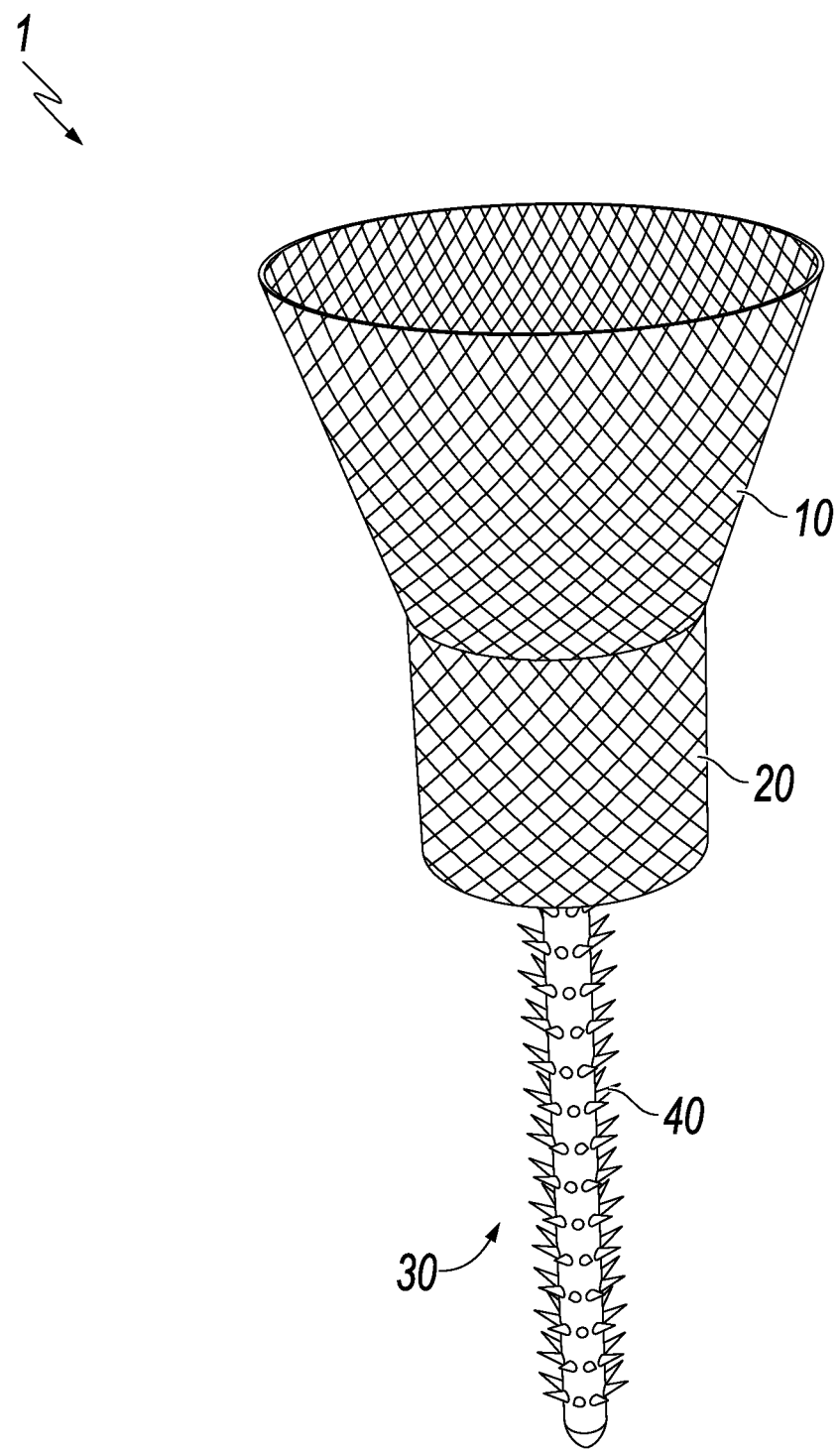
FIG. 1 is a front perspective view of a first embodiment of an ice cream cone spike.

1 Edible ice cream cone spike
10 Top

20 Bottom
30 Spike
40 Barb
50 Platform
60 Inscribed spiral
70 Tapered end
80 Blunt end
90 Stack of cream sandwich cookies
100 Stack of donut holes
110 Toasted rice cereal material
120 Stack of macarons
130 Stack of cookies
140 Adhesive

DETAILED DESCRIPTION OF THE INVENTION

FIG. 1 shows a front perspective view of a first embodiment of an edible ice cream cone spike 1. Top 10 is a hollow truncated cone having an open wider end and an open narrow end. The open narrower end connects and continues into a hollow cylindrical bottom 20. Top 10 and bottom 20 are edible wafers such as that found in traditional "sugar" or "safety" cones, although other edible materials can be used. Spike 30 descends from the platform (not shown in this view) and is covered with a plurality of barbs 40. Here, the barbs 40 are shown pointing up toward the bottom, at an acute angle relative to the length of the spike. They are shown here in regular rows and columns, but they may also be staggered. The barbs are also shown the same size, but the size, too, can be varied. One way to produce the spike and barbs is by injection of raw dough into molds that are configured with spikes, which dough then can be baked to create a crispy top and bottom portion.

Another method of producing the spike and barbs is to first form the spike by wrapping flat, specially shaped wafers that are still soft and malleable immediately after baking around cone-shaped inner molds. The wafers would be loosely wrapped at the top to form traditional cone shapes, and tightly wrapped at the bottom to form the spike and/or squeezed to form the barbs.

Figure 2:
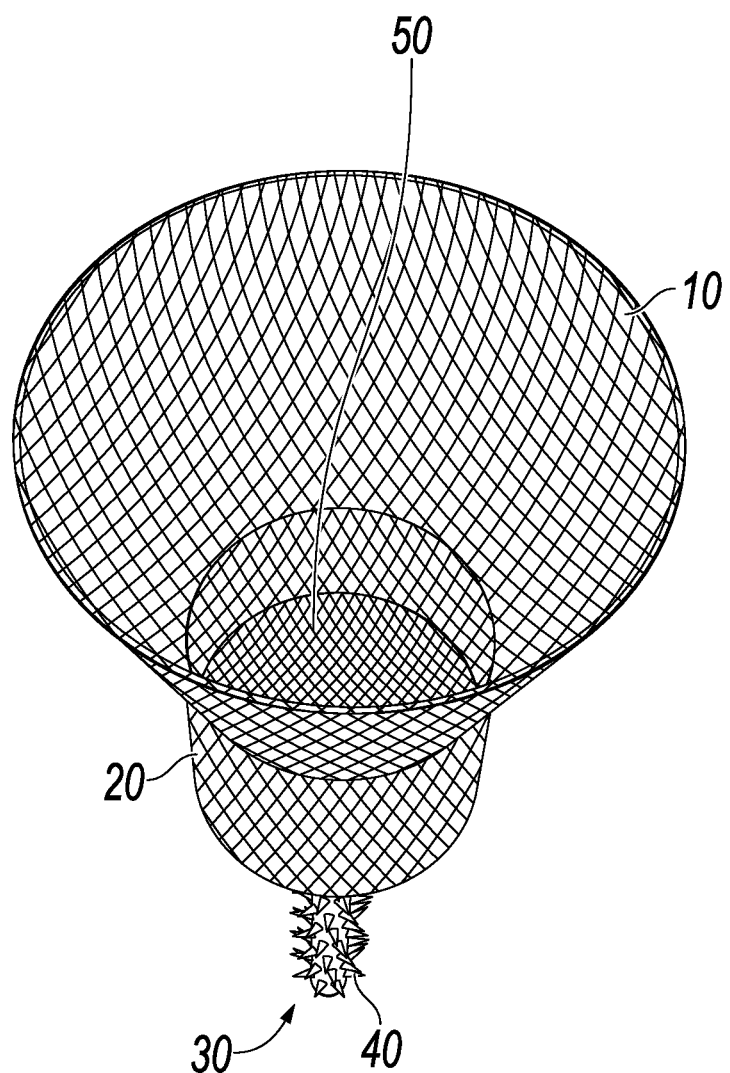
FIG. 2 is a top perspective view thereof.
Figure 3:
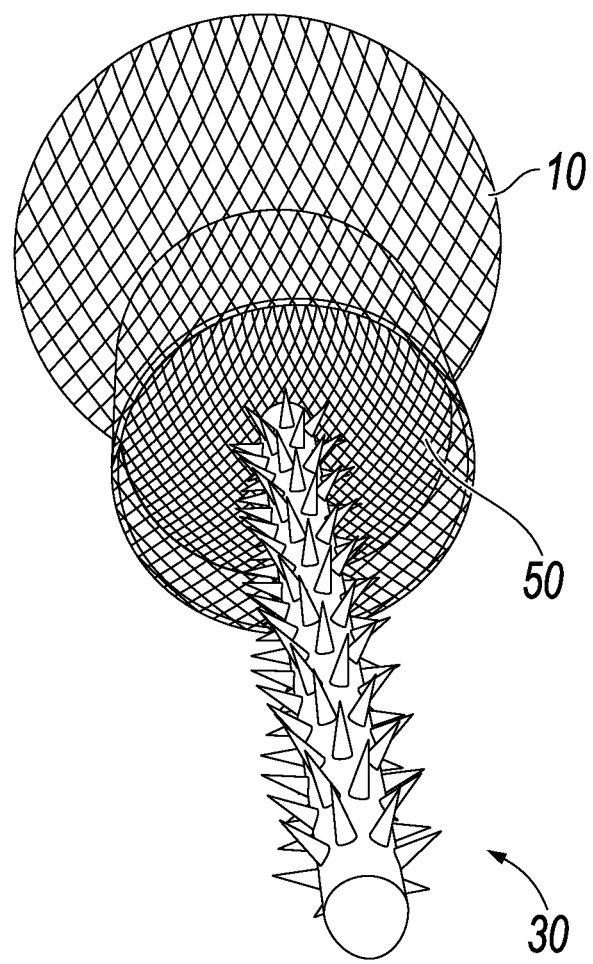
FIG. 3 is a bottom perspective view thereof.
Figure 4:
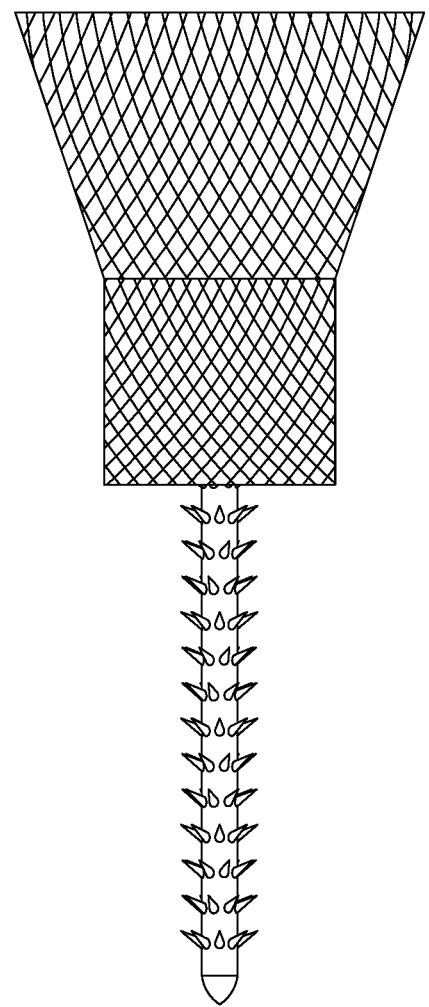
FIG. 4 is a front view thereof.

FIGS. 2 and 3 are a top and bottom perspective view of the ice cream cone spike. These views together show the position of integral platform 50. Note particularly that the platform closes off the opening within the cylindrical bottom. Note also that the platform divides the cylindrical bottom into an upper interior space (which would support and surround a scoop of ice cream), and a lower interior space through which spike 30 passes. Spike 30 extends beyond the lower open edge of the cylindrical bottom. The point on the platform where the platform joins the spike is above the lower open edge of the cylinder, thereby concealing where the spike and the platform connect, when viewed from the front. All that the user sees is spike 30 (FIG. 4). Spike 30 is approximately 0.25-0.75 inches across and 0.25-5 inches long. FIG. 4 shows a front view thereof. Note in particular the end of the spike is tapered.

FIGS. 5-13 show several variations and combinations of shape of the end of the spike (blunt 80 or tapered 70), spike textures, and the profile of the platform 50. In FIGS. 1-4, platform 50 is flat. In FIGS. 5-13 platform 50 is convex, or dome shaped. The tapered variation makes it easier for the spike to skewer the edible treats. The blunt end is easier for a person to grasp. Also in FIGS. 7-9, platform 50 is convex. This is one variation. In either shape, platform 50 has a diameter of approximately 1 to 2.5 inches. Spike 30 is roughly 0.25 to 0.75 inches in diameter and 0.25 inches-5 inches long.

Figure 7:
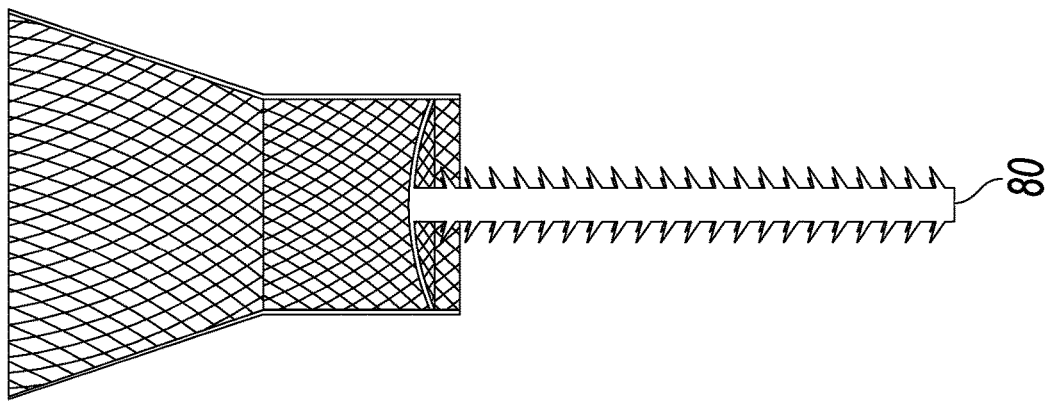
FIG. 7 is a side view of a fourth embodiment of an ice cream cone spike.
Figure 6:
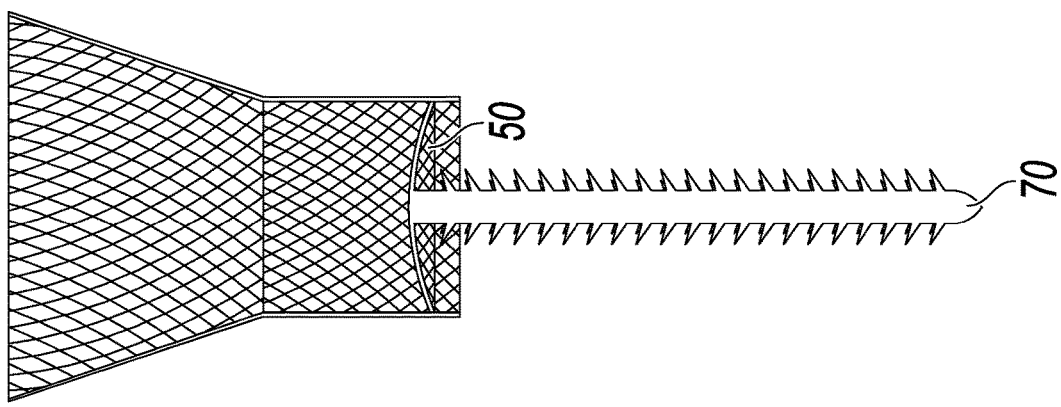
FIG. 6 is a cross-section view of a third embodiment of an ice cream cone spike.
Figure 5:
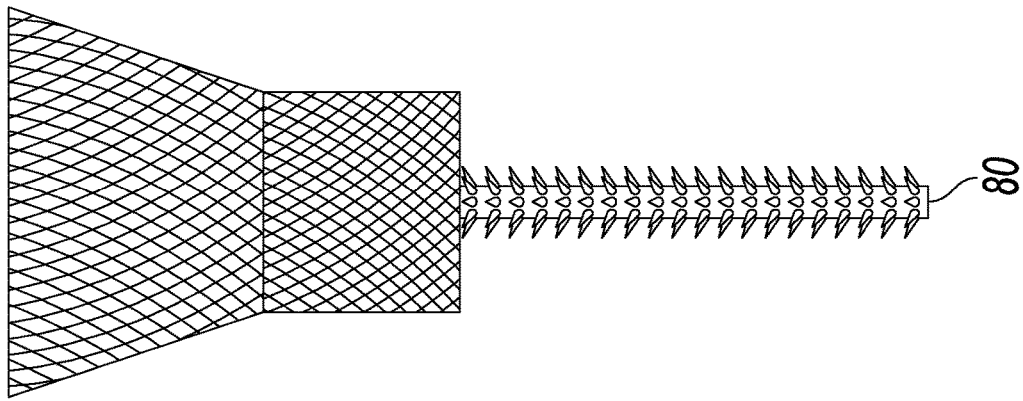
FIG. 5 is a front view of a second embodiment of an ice cream cone spike.
Figure 10:
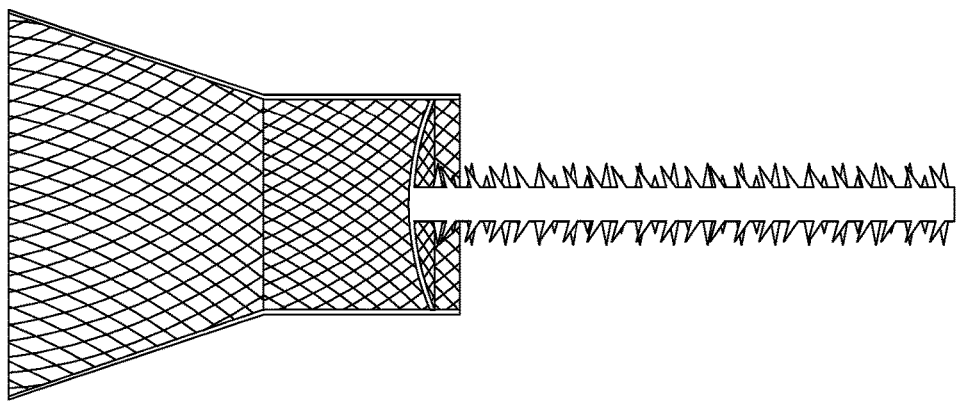
FIG. 10 is a side view of a seventh embodiment of an ice cream cone spike.
Figure 9:
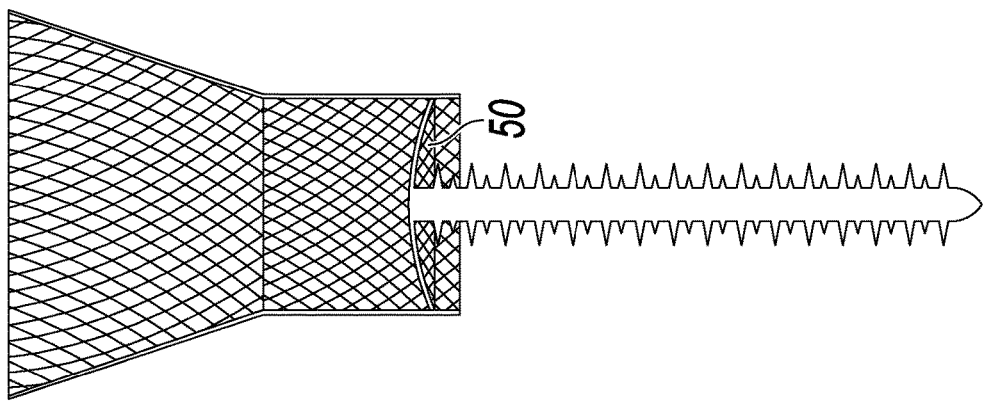
FIG. 9 is a cross-section view of a sixth embodiment of an ice cream cone spike.
Figure 8:
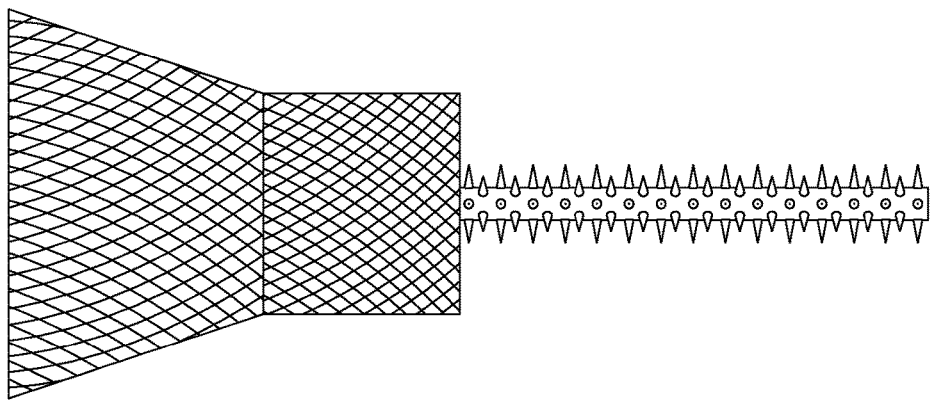
FIG. 8 is a front view of a fifth embodiment of an ice cream cone spike.
Figure 13:
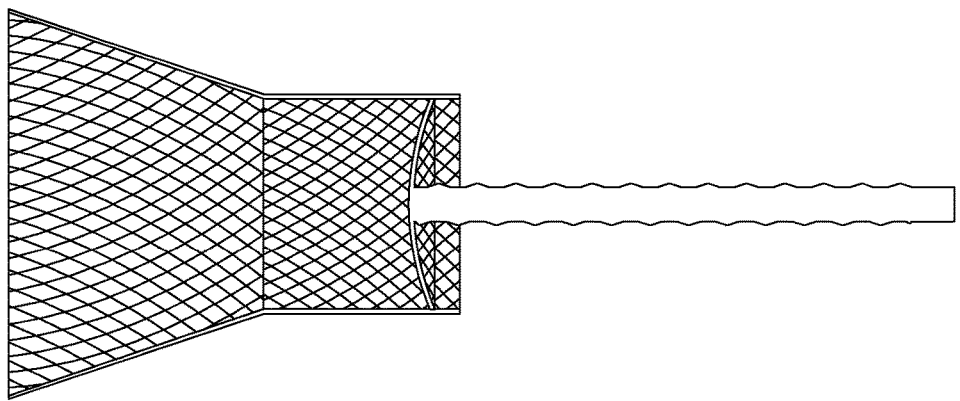
FIG. 13 is a cross-section view of a tenth embodiment of an ice cream cone spike.
Figure 12:
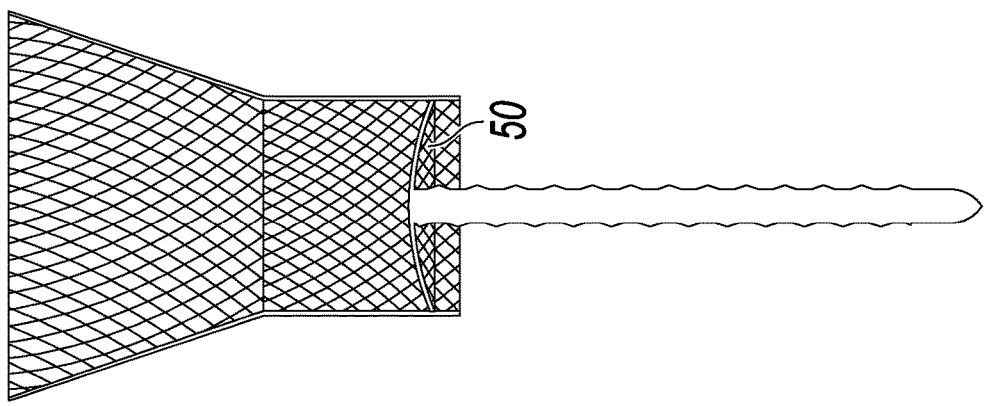
FIG. 12 is a cross-section view of a ninth embodiment of an ice cream cone spike.
Figure 11:
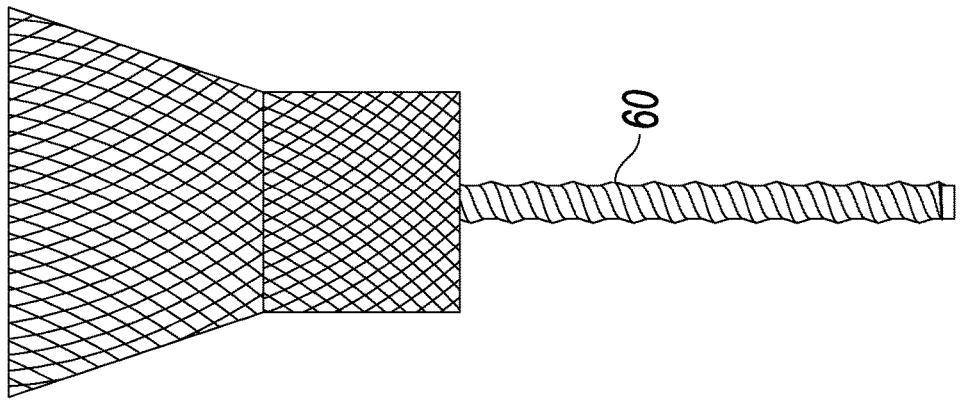
FIG. 11 is a front view of an eighth embodiment of an ice cream cone spike.
Figure 14:
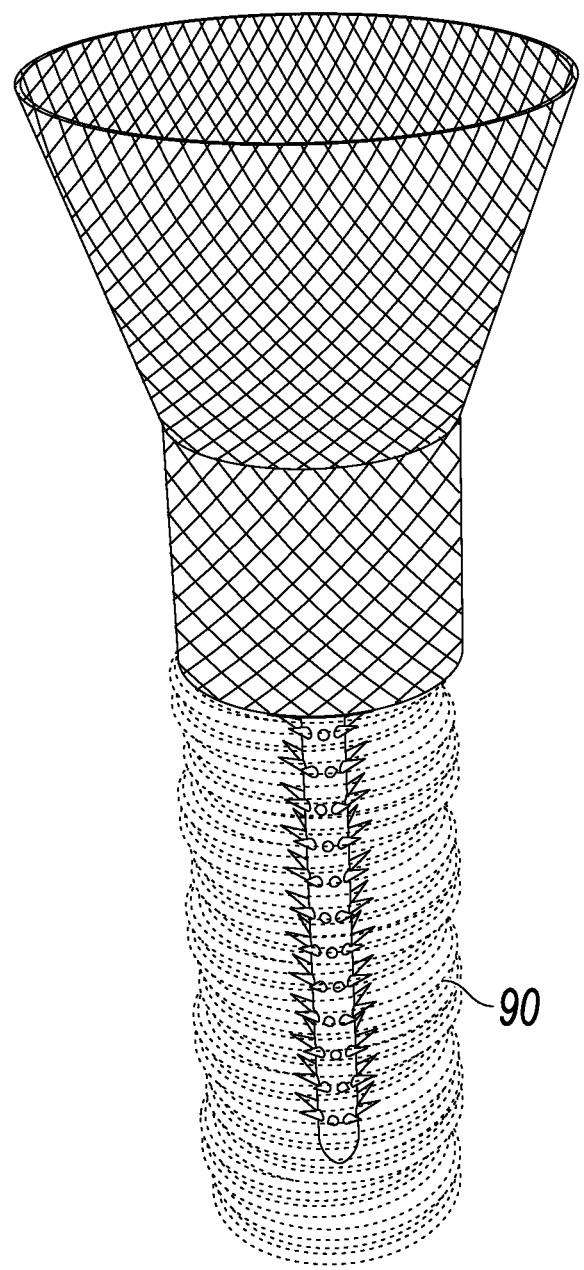
FIG. 14 is a front perspective view of the first embodiment of an ice cream cone spike, shown with cream sandwich cookies stacked therearound.
Figure 15:
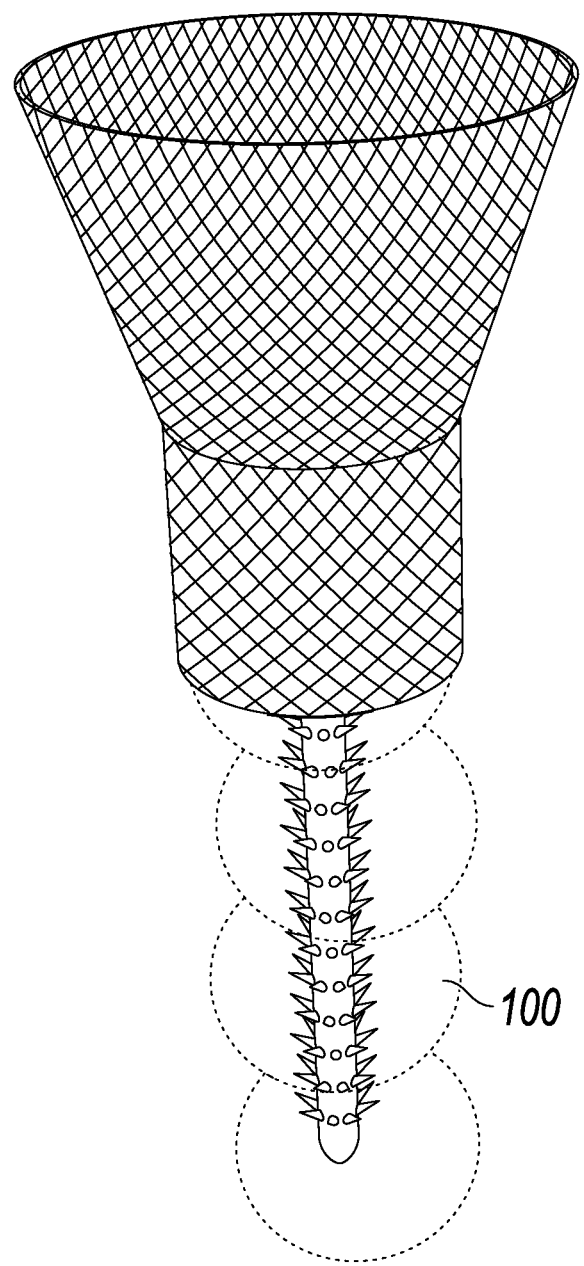
FIG. 15 is a front perspective view of the first embodiment, shown with donut holes stacked therearound.
Figure 16:
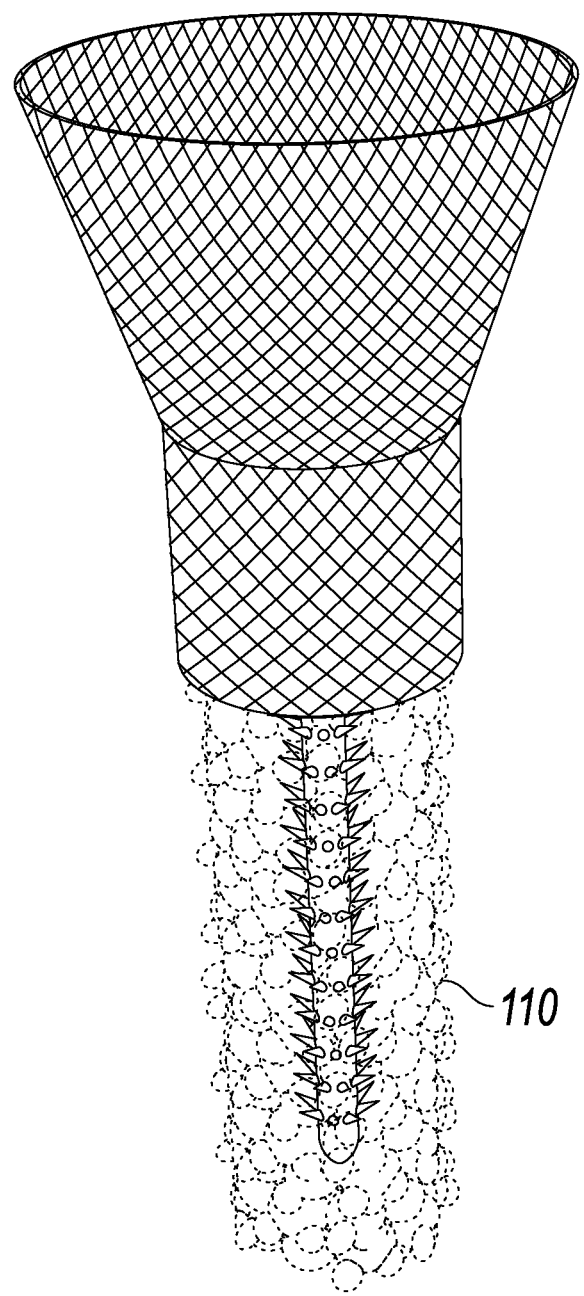
FIG. 16 is a front perspective view of the first embodiment, shown with toasted rice cereal material adhered therearound.
Figure 17:
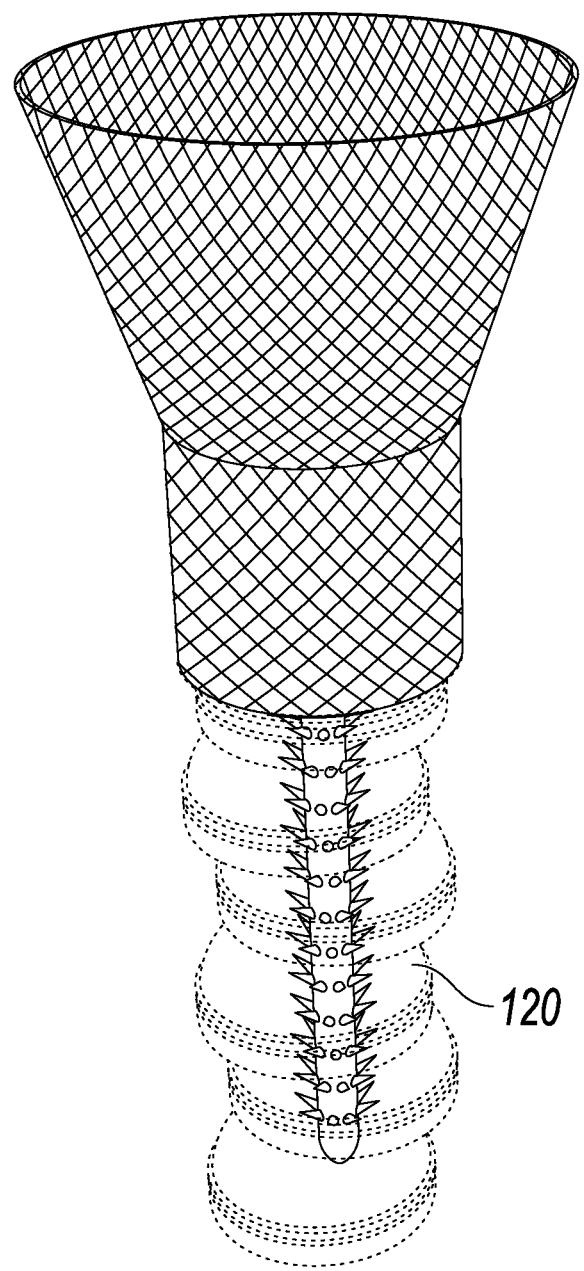
FIG. 17 is a front perspective view of the first embodiment, shown with macarons stacked therearound.
Figure 18:
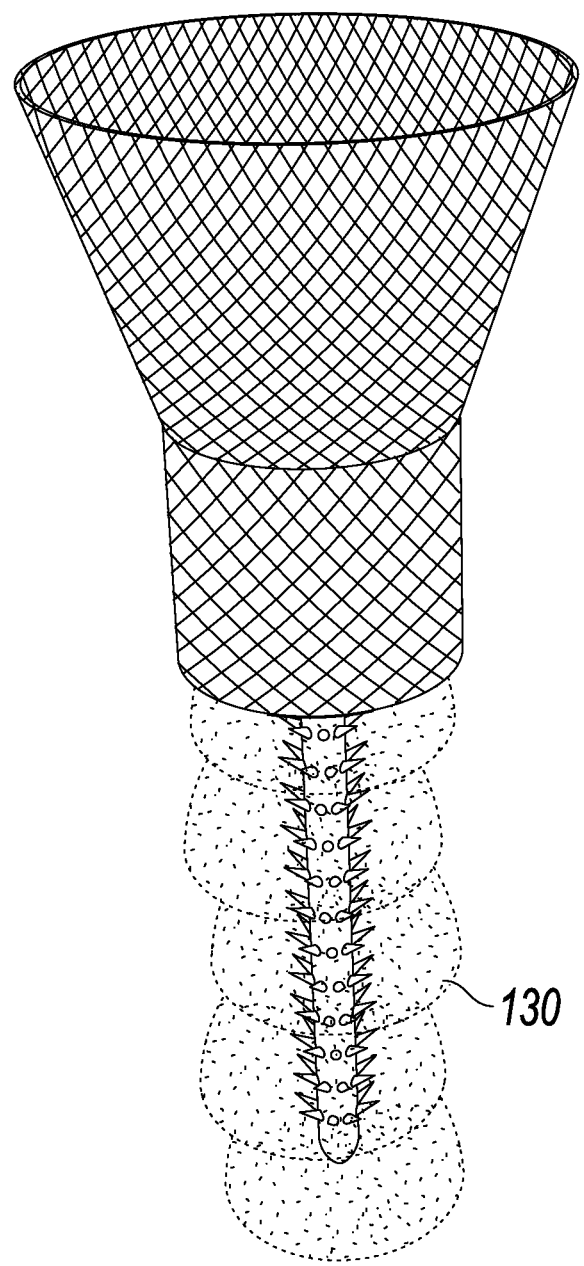
FIG. 18 is a front perspective view of the first embodiment, shown with cookies stacked therearound.
Figure 19:
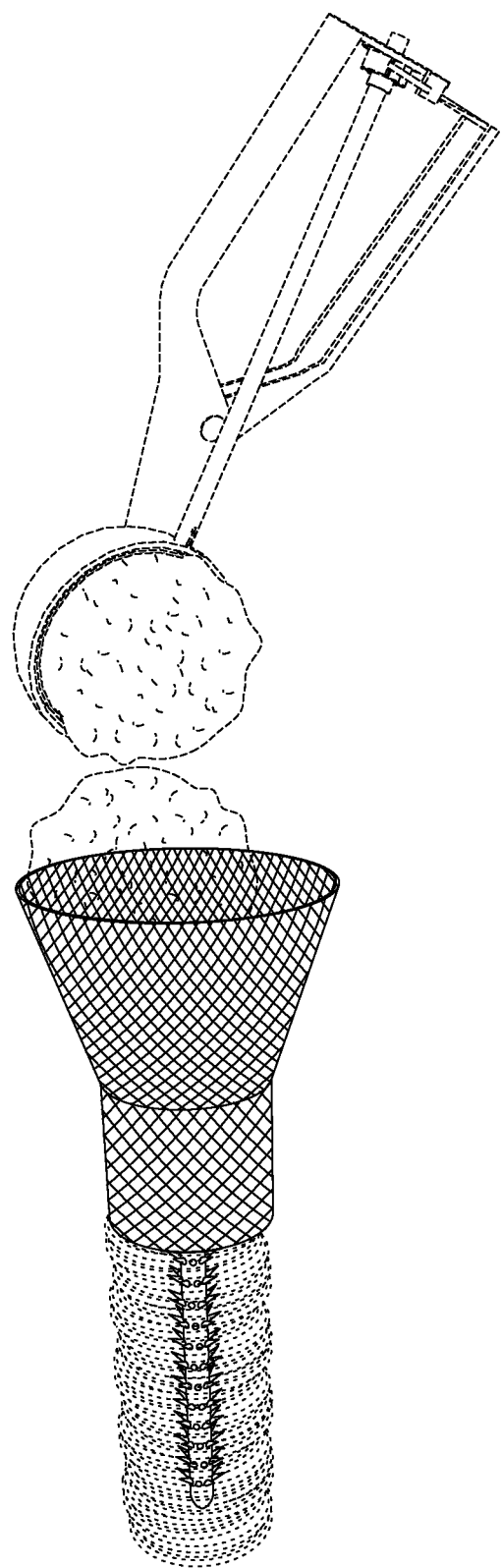
FIG. 19 is a front perspective view showing ice cream being scooped into the first embodiment.

FIGS. 5-7 show barbs pointed toward the cylindrical bottom, that is, at an acute angle relative to the length of the spike. FIGS. 8-10 show barbs pointed perpendicular to the length of the spike. FIG. 10 shows a combination of barbs pointed both toward the cylindrical bottom and perpendicular to the length of the spike. FIGS. 11-13 show a spiral inscribed into the length of the spike.

Figure 20:
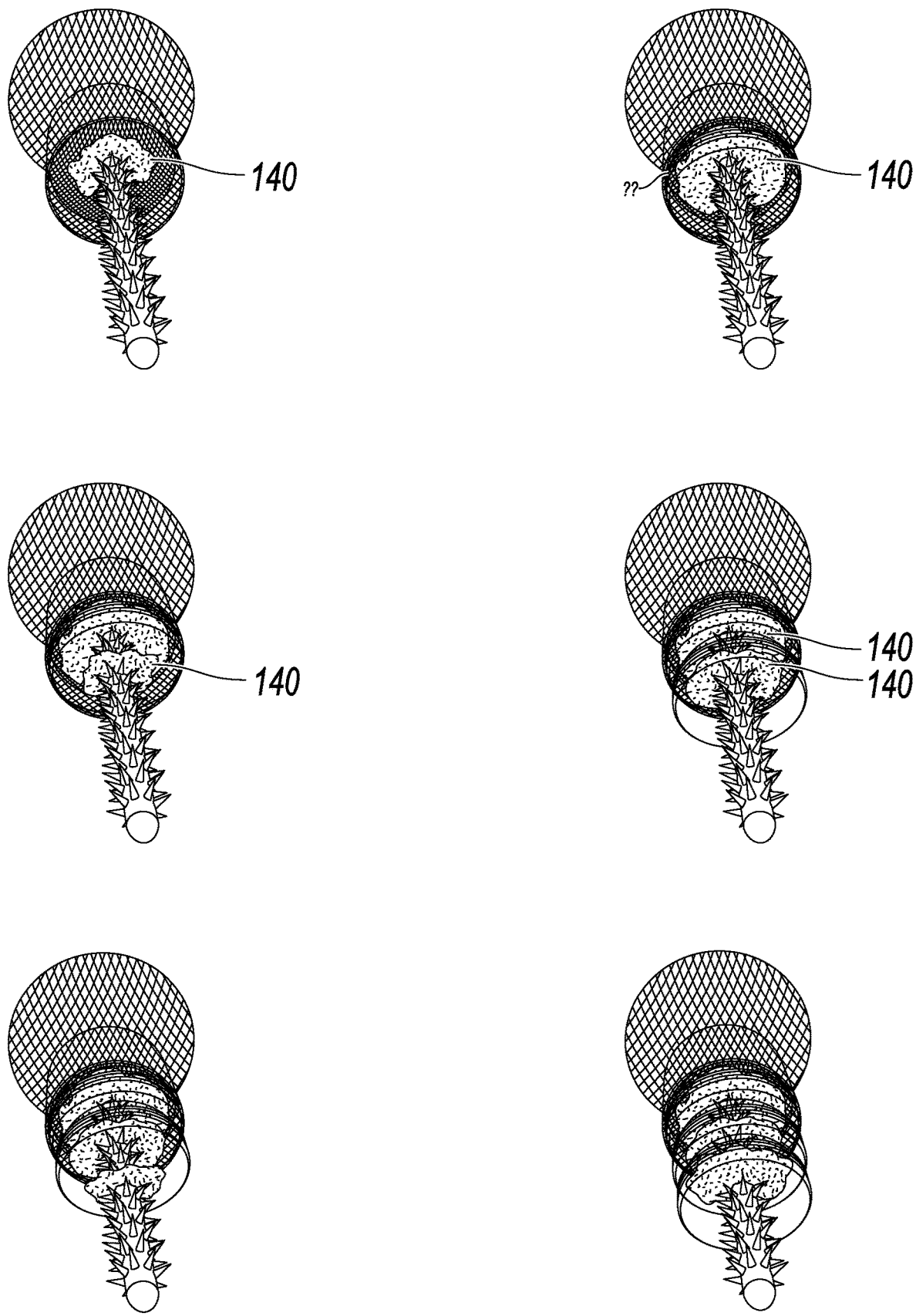
FIGS. 20-21 are bottom perspective views showing stepwise application of edible adhesive and assembly of a stacked ice cream cone spike.
Figure 21:
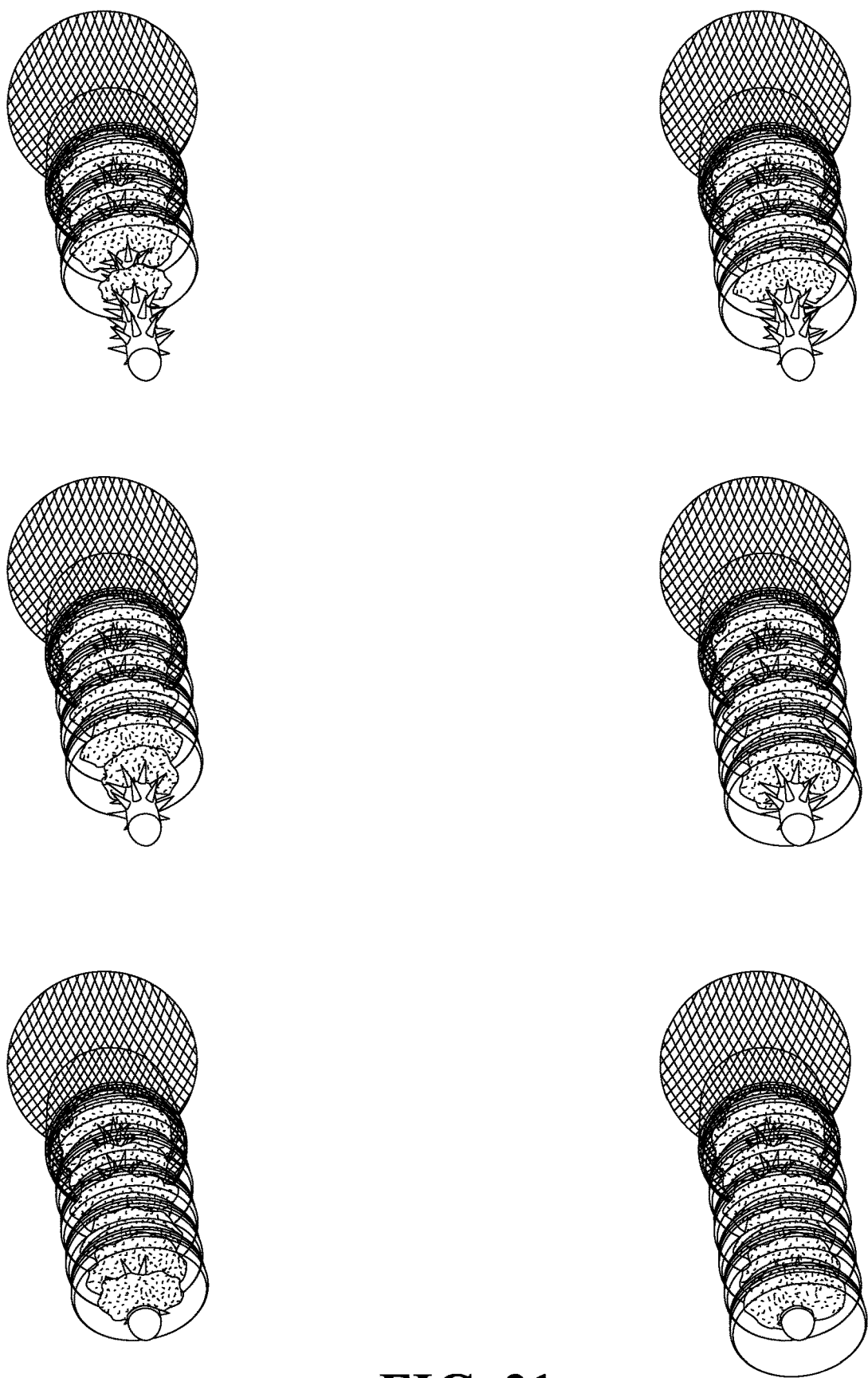

As we continue to skewer and stack additional edible treats along the spike, we apply a generous layer of edible adhesive material 140 onto the length of the spike. We have had success with materials such as peanut butter, caramel, marshmallow, nougat, syrup, pectin. However, we contemplate other materials would work and fit within the scope of this invention. We further ensure individual treats stick together by applying edible adhesive between them, as we stack them. To still further increase the edible treats sticking to the spike, and to prevent the edibles from unintentionally sliding off the spike, the edible nestled closest to the cone will be glued to the bottom of the cone using any of the above-referenced edible adhesive materials. FIGS. 20-21 stepwise illustrate this stacking and adhesive process with 5 macarons.

Edible treats of varying dimensions can be stacked one on top of the other to ensure that edible treats farthest from the cone can be detached more easily than the pieces closer to the cone. Stacked edibles, such as sandwich cookies and toasted rice cereal material may be stacked, adhered to one another in advance to form an edible cartridge (not shown). These cartridges can then be slid on to the spike as a single unit, instead requiring the edibles to be stacked piece-by-piece.

Edible treats that normally have a softer consistency, such as mini-donuts and brownies, can be secured to the spike via mini edible plates (not shown). The plates will be circular, roughly 1 to 2.5 inches in diameter, and configured with center holes roughly 0.5 to 1 inch in diameter. These edible plates will be made of semi-rigid edible materials (having a consistency similar to the consistency of the wafer portion of a sandwich cookie) or of more rigid or even crispy edible materials. Thus, mini donuts and other edibles of soft consistency can be stacked on (and manually detached from) the spike as edible, then mini plate, then edible, then mini plate, and so forth.

To remove each piece of edible treat from the spike while or after eating the ice cream, the user can either slide the edible off (since the friction holding the edible on the spike would not be so strong as to prevent easy manual removal of the edible), or the user could break the spike at the place where it holds the edible or could unscrew the edible if the spike is comprised a screw configuration.

Although embodiments and examples of the invention have been shown and described, it is to be understood that various modifications, substitutions, and rearrangements of parts, components, steps, as well as other uses, shapes, construction, and design of this system can be made by those skilled in the art without departing from the novel spirit and scope of this invention.

We claim:
1. An edible ice cream cone spike, comprising:
   a. a hollow truncated conical top having an open wider end and an open narrower end, the open narrower end connected to and continuing into a hollow cylindrical bottom;

b. a platform joined perpendicular to, and within, the hollow cylindrical bottom such that this platform completely seals and divides the hollow cylindrical bottom into an upper interior space that can completely support and surround a scoop of ice cream, and a lower interior space; and c. a textured spike abutting against the platform, and descending from the platform through and beyond the lower interior space, this textured spike having a length and a surface area, and wherein the texture:
  i. fills and covers substantially the entire length and surface area of the textured spike, and wherein:
  ii. is either barbs radiating and projecting from the textured spike or a spiral inscribed into the textured spike wherein the lower interior space conceals the platform-textured spike joint.

2. The edible ice cream cone spike of claim 1, wherein the plurality of barbs radiates and projects perpendicular to the length of the textured spike.

3. The edible ice cream cone spike of claim 1, wherein the plurality of barbs radiates and projects at an acute angle relative to the length of the textured spike.

4. The edible ice cream cone spike of claim 1, further comprising an edible adhesive joining the spike to edible treats.

5. The edible ice cream cone spike of claim 4, wherein the adhesive is selected from the group consisting of peanut butter, caramel, marshmallow, nougat, syrup, and pectin.

6. A method of supporting a scoop of ice cream, comprising the steps of:
  a. Scooping the ice cream into an upper interior space of the ice cream cone spike of claim 1;
  b. Coating the length and the surface area of the ice cream cone spike with edible adhesive; and
  c. Adhering edible treats to the coated ice cream cone spike.

7. The method of claim 6, wherein the adhering step is skewering the edible treats onto the coated ice cream cone spike.

8. The method of claim 7, wherein the adhering step is pressing the edible treats onto the coated ice cream cone spike.

* * * * *